(12) United States Patent
Wan et al.

(10) Patent No.: US 11,086,090 B2
(45) Date of Patent: Aug. 10, 2021

(54) CABLE FIXING APPARATUS, CABLE CONNECTOR AND ELECTRICAL DEVICE

(71) Applicant: Tyco Electronics (Shanghai) Co. Ltd., Shanghai (CN)

(72) Inventors: Qingquan Wan, Dongguan (CN); Zhigang Song, Shanghai (CN); Jiahui Chen, Shanghai (CN); Haibo Zhang, Shanghai (CN); Songhua Liu, Dongguan (CN); Yunhe Wang, Shanghai (CN); Ji Luo, Dongguan (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 16/727,540

(22) Filed: Dec. 26, 2019

(65) Prior Publication Data

US 2020/0209503 A1 Jul. 2, 2020

(30) Foreign Application Priority Data

Dec. 28, 2018 (CN) .......................... 201811652612.3

(51) Int. Cl.
*H01R 13/512* (2006.01)
*G02B 6/44* (2006.01)
(Continued)

(52) U.S. Cl.
CPC .......... *G02B 6/4471* (2013.01); *G02B 6/4292* (2013.01); *H01R 13/512* (2013.01);
(Continued)

(58) Field of Classification Search
CPC .. G02B 6/4471; G02B 6/4292; H01R 13/512; H01R 13/5205; H01R 13/5825; H01R 13/6581; H01R 13/74
(Continued)

(56) References Cited

U.S. PATENT DOCUMENTS 3,437,980 A * 4/1969 Smith .................... H01R 13/58
439/469
4,114,974 A * 9/1978 Lawrence .......... H01R 13/5205
439/462
(Continued)

FOREIGN PATENT DOCUMENTS

CN 103177832 A 6/2013
CN 105206987 A 12/2015
(Continued)

OTHER PUBLICATIONS

Abstract of CN106249366, dated Dec. 21, 2016, 1 page.

*Primary Examiner* — Tho D Ta
(74) *Attorney, Agent, or Firm* — Barley Snyder (57) ABSTRACT

A cable fixing apparatus adapted to be fixed to an end of a cable includes a first sleeve having a first thread portion at a first end of the first sleeve, a second sleeve having a bottom portion with a through hole at first end of the second sleeve, and a clamp mechanism disposed in the second sleeve between the first thread portion of the first sleeve and the bottom portion of the second sleeve. The cable is inserted into the second sleeve and the first sleeve through the through hole in an insertion direction. The second sleeve is threaded onto the first thread portion at a second end of the second sleeve. The clamp mechanism clamps the cable in response to an engagement of the second end of the second sleeve to the first thread portion to prevent the cable from moving in the first sleeve and the second sleeve.

17 Claims, 10 Drawing Sheets

(51) Int. Cl.
*G02B 6/42* (2006.01)
*H01R 13/52* (2006.01)
*H01R 13/58* (2006.01)
H01R 13/6581 (2011.01)
H01R 13/74 (2006.01)

(52) U.S. Cl.
CPC ..... *H01R 13/5205* (2013.01); *H01R 13/5825* (2013.01); *H01R 13/6581* (2013.01); *H01R 13/74* (2013.01)

(58) Field of Classification Search
USPC ........................................ 439/544, 587, 462
See application file for complete search history.

(56) References Cited

U.S. PATENT DOCUMENTS

| | | | | |
|---|---|---|---|---|
| 5,135,404 A | * | 8/1992 | Clark | H01R 13/53 439/106 |
| 5,211,576 A | * | 5/1993 | Tonkiss | H01R 13/59 439/462 |
| 5,743,759 A | * | 4/1998 | Pudims | H01R 13/5205 439/462 |
| 8,672,705 B2 | | 3/2014 | Schneider | |
| 8,735,722 B2 | | 5/2014 | Scholten et al. | |
| 9,122,021 B2 | | 9/2015 | Elenbaas et al. | |
| 9,223,093 B2 | * | 12/2015 | Toda | G02B 6/3887 |
| 10,082,230 B2 | | 9/2018 | Dieduksman et al. | |
| D878,305 S | * | 3/2020 | Nguyen | B61D 43/00 D13/156 |
| 2010/0261367 A1 | * | 10/2010 | Billman | H01R 13/5202 439/271 |
| 2013/0164979 A1 | | 6/2013 | Dendas et al. | |

FOREIGN PATENT DOCUMENTS

| | | |
|---|---|---|
| CN | 106249366 A | 12/2016 |
| EP | 2579396 A1 | 4/2013 |

\* cited by examiner

CABLE FIXING APPARATUS, CABLE CONNECTOR AND ELECTRICAL DEVICE

CROSS-REFERENCE TO RELATED APPLICATION

This application claims the benefit of the filing date under 35 U.S.C. § 119(a)-(d) of Chinese Patent Application No. 201811652612.3, filed on Dec. 28, 2018.

FIELD OF THE INVENTION

The present invention relates to a cable connector and, more particularly, to a cable fixing apparatus of a cable connector.

BACKGROUND

An electrical device such as a high-speed electrical connector, a photoelectric conversion module and the like needs to be connected with an external cable such as an optical cable or an electric cable through a cable connector during operation. Generally, a tail sleeve is mounted at a portion of the cable, which is connected with the cable connector, to protect the cable from being broken due to multiple instances of bending. A protective housing is provided outside the tail sleeve and the cable connector to prevent external impurities such as moisture, dust and the like from entering interiors of the cable connector and the electrical device so as to protect the tail sleeve and the cable.

SUMMARY

A cable fixing apparatus adapted to be fixed to an end of a cable includes a first sleeve having a first thread portion at a first end of the first sleeve, a second sleeve having a bottom portion with a through hole at first end of the second sleeve, and a clamp mechanism disposed in the second sleeve between the first thread portion of the first sleeve and the bottom portion of the second sleeve. The cable is inserted into the second sleeve and the first sleeve through the through hole in an insertion direction. The second sleeve is threaded onto the first thread portion at a second end of the second sleeve. The clamp mechanism clamps the cable in response to an engagement of the second end of the second sleeve to the first thread portion to prevent the cable from moving in the first sleeve and the second sleeve.

BRIEF DESCRIPTION OF THE DRAWINGS

The invention will now be described by way of example with reference to the accompanying Figures, of which.

DETAILED DESCRIPTION OF THE EMBODIMENT(S)

While the disclosure will be fully described with reference to the accompanying drawings containing embodiments thereof, it will be understood by those skilled in the art that the disclosure described herein can be modified while achieving the technical effects of the disclosure. Therefore, it should be understood that the description is a broad disclosure for those skilled in the art, and its content is not intended to limit the exemplary embodiments described herein.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

A cable fixing apparatus according to an embodiment adapted to be fixed on an end of a cable 100, as shown in FIGS. 1-5, comprises a first sleeve 1, a second sleeve 2, and a clamp mechanism 3.

Figure 4:
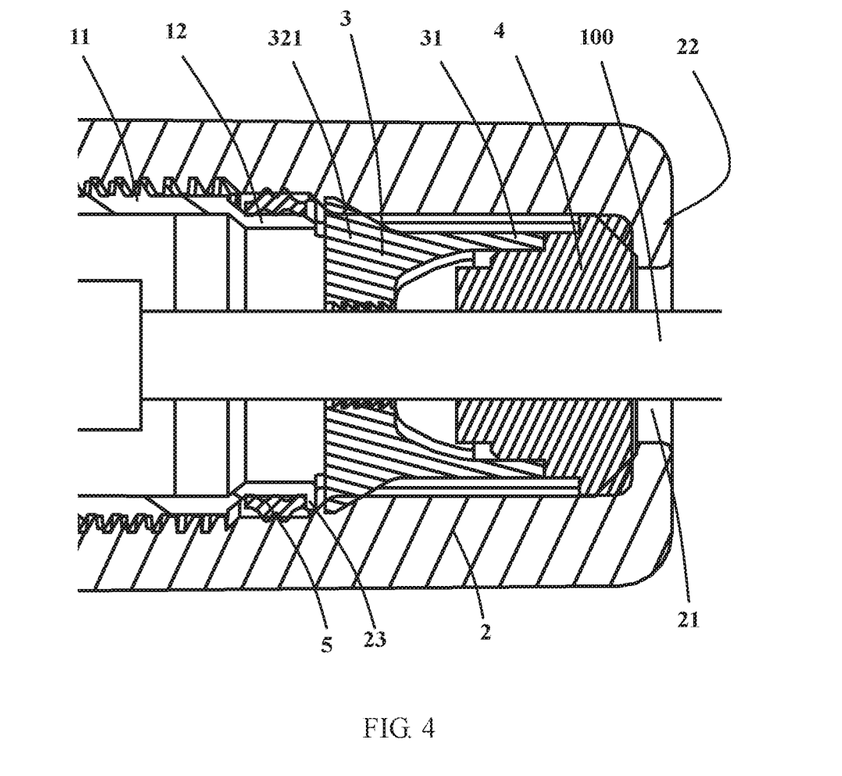
FIG. 4 is an enlarged view of a portion B of FIG. 3.
Figure 5:
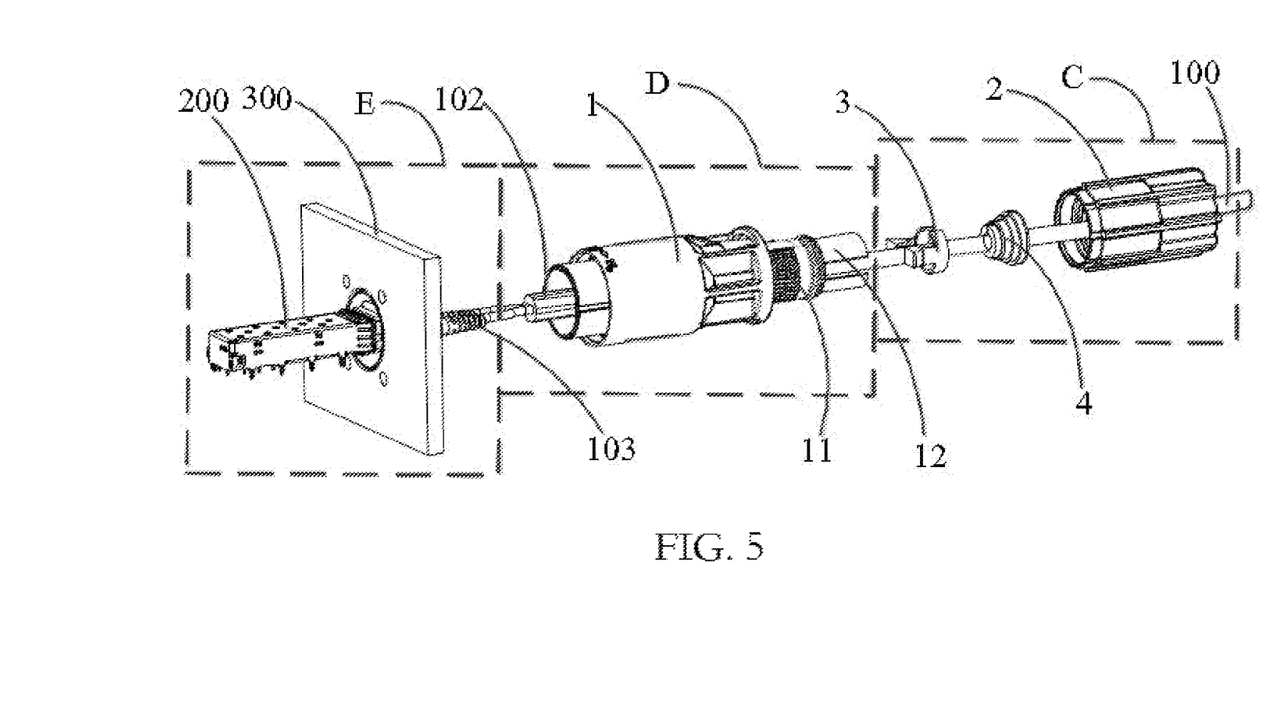
FIG. 5 is an exploded perspective view of the electrical device of FIG. 1.

The first sleeve 1, as shown in FIGS. 4 and 5, has a first thread portion 11 at a first end of the first sleeve 1. In the shown embodiment, the first thread portion 11 is an external thread extending from a body portion of the first sleeve 1. The second sleeve 2 has a bottom portion 22, which has a through hole 21 at first end of the second sleeve 2. An end of the cable 100 is inserted into the second sleeve 2 and the first sleeve 1 through the through hole 21 in an insertion direction. The second sleeve 2 is threaded onto the first thread portion 11 by an internal thread portion 24 of the second sleeve 2, shown in FIG. 6, at a second end of the second sleeve 2 to engage the first sleeve 1 and the second sleeve 2 with each other. In other embodiments, an internal thread portion of the first sleeve 1 may be engaged with an external thread portion of the second sleeve 2.

The clamp mechanism 3 is provided in the second sleeve 2 and between the first thread portion 11 of the first sleeve 1 and the bottom portion 22 of the second sleeve 2, as shown in FIG. 4. The clamp mechanism 3 clamps the cable 100 in response to the engagement of the second end of the second sleeve 2 to the first thread portion 11 of the first sleeve 1, so as to prevent the cable 100 from moving in the first sleeve 1 and the second sleeve 2.

Figure 2:
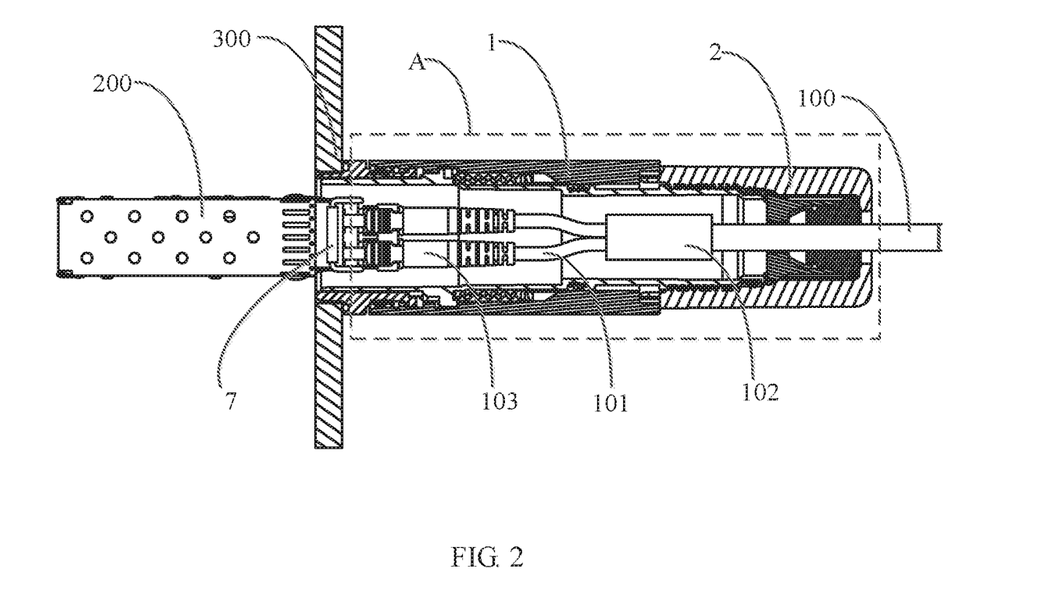
FIG. 2 is a sectional plan view of the electrical device of FIG. 1.
Figure 3:
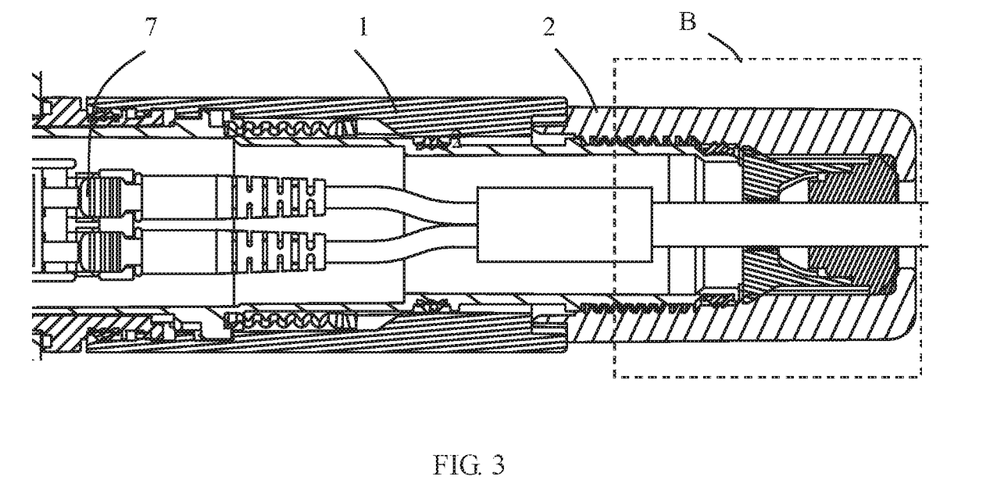
FIG. 3 is an enlarged view of a portion A of FIG. 2.
Figure 13:
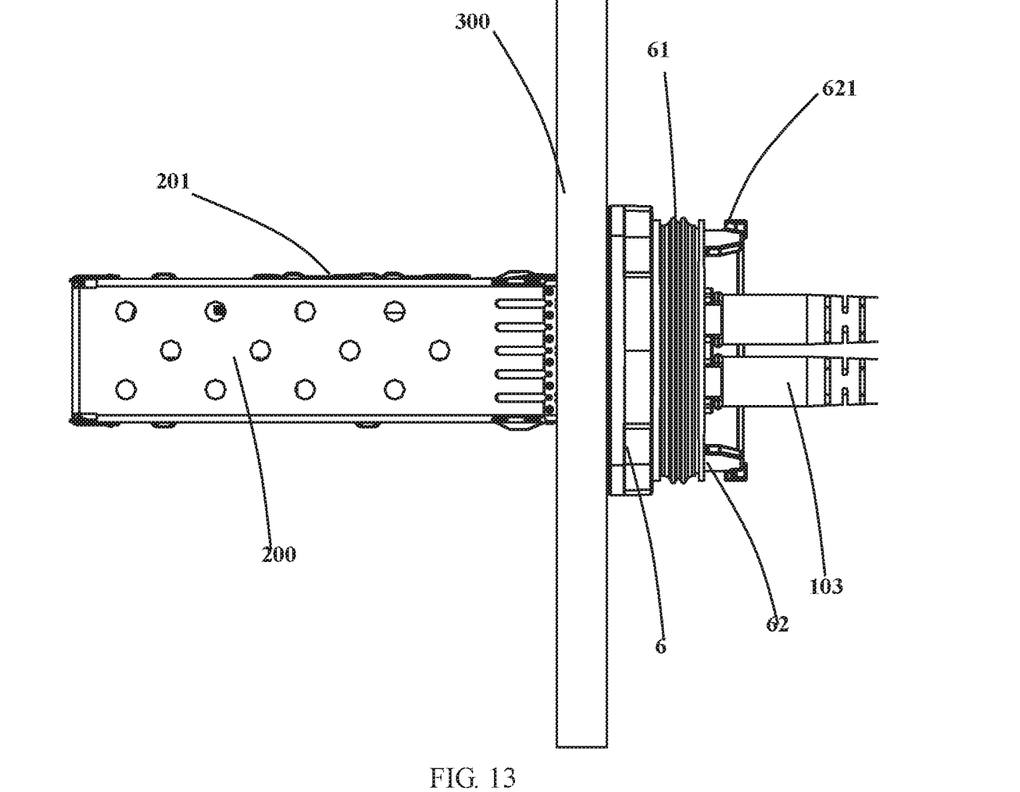
FIG. 13 is an enlarged view of a portion F of FIG. 9.

A cable connector according to an embodiment, as shown in FIGS. 2, 3, 10, and 13, comprises the cable fixing apparatus, a third sleeve 6, and a connector body 7. The third sleeve 6 has a second thread portion 61 at a first end of the third sleeve 6, as shown in FIG. 13. The second thread portion 61 is engaged with the second end of the first sleeve 1. The connector body 7 is mounted within the third sleeve 6, as shown in FIGS. 2 and 3, and the end of the cable 100 is connected to the connector body 7.

In an embodiment shown in FIG. 2, the cable 100 is an optical cable having a plurality of optical fibers 101. The connector body 7 is an optical fiber connector adapted to connect the optical fibers 101. A tail tube 103 is provided at a portion of the optical fiber 101, which is connected to the optical fiber connector, to protect the connection of the optical fiber 101. Further, a protective tube 102 is provided at a portion of the optical fiber 101, exposing a protective layer of the optical cable 100, to protect the optical fiber 101, and the protective layer which is not removed. In another embodiment, the cable 100 is an electrical cable having a plurality of wires and the connector body 7 is an electrical connector adapted to connect the wires.

In a state where the cable 100 is connected to the connector body 7, the first sleeve 1 and the third sleeve 6 of the cable fixing apparatus are engaged with each other. Because the cable 100 may be fixed by the cable fixing apparatus, it is possible to prevent the cable 100 from moving in the first sleeve 1 and the second sleeve 2, thereby avoiding failure of the connection of the cable 100 with the connector body 7 and protecting the cable 100 from being damaged.

Figure 6:
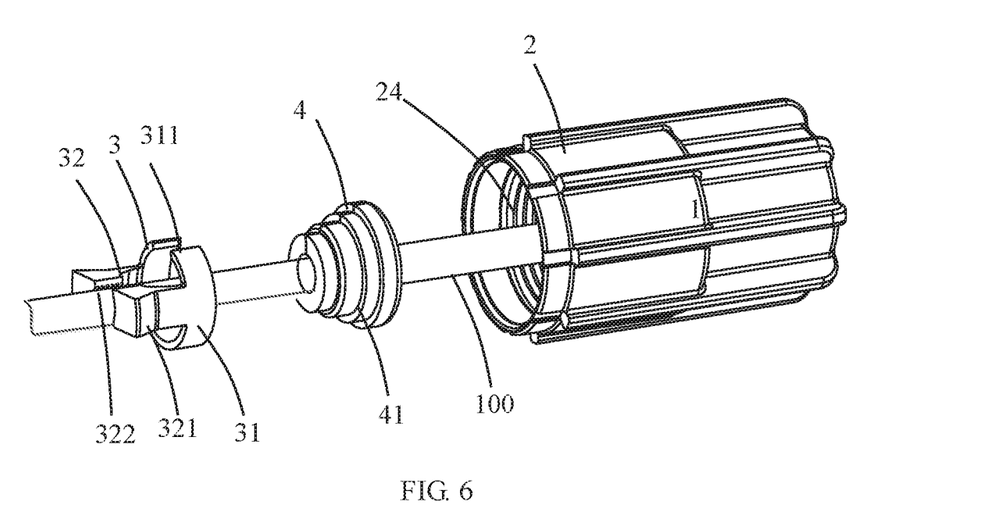
FIG. 6 is an enlarged view of a portion C of FIG. 5.

The clamp mechanism 3, as shown in FIGS. 4 and 6, has an annular portion 31 sleeved over the cable 100, and at least two clamp arms 32 each extending from the annular portion 31 towards the first thread portion 11 in the insertion direction. An inner wall of the second sleeve 2 has an annular press protrusion 23 protruding radially inwardly. The press protrusion 23 presses the clamp arms 32 to be moved radially inwardly toward each other in response to the engagement of the second end of the second sleeve 2 with the first thread portion 11 of the first sleeve 1 to clamp the cable 100.

In an embodiment, as shown in FIG. 4, each of the clamp arms 32 is formed as a wedge feature 321 gradually obliquely protruding radially outwardly in the insertion direction. Thus, as the second sleeve 2 is engaged to the first sleeve 1 by gradually rotating, the press protrusion 23 gradually presses the clamp arms 32 to be moved radially inwardly towards each other, thereby gradually clamping the cable 100. Further, the press protrusion 23 has an inclined surface in contact with the wedge feature 321, so that the press protrusion 23 is in smooth contact with the wedge feature 321.

The annular portion 31 has an opening 311, as shown in FIG. 6, such that an inner diameter of the annular portion 31 is variable. In this way, it is possible to allow the annular portion 31 to be deformed such that the inner diameter of the annular portion 31 becomes smaller when the clamp arms 32 move radially inwardly towards each other, thereby avoiding undesirable deformation of the annular portion 31. An inner side surface of each of the grip arms 32 has a plurality of projections 322 to allow the cable 100 to be firmly fixed by the clamp arms 32.

Figure 7:
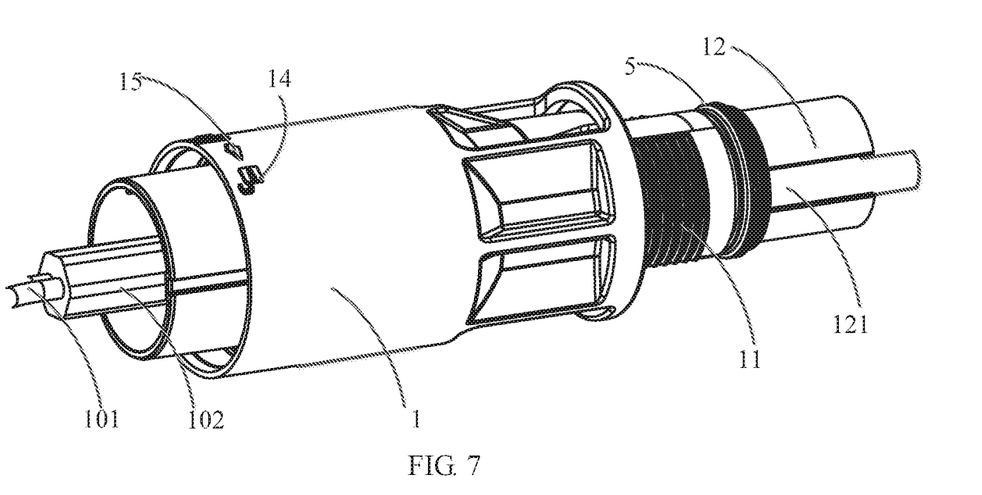
FIG. 7 is an enlarged view of a portion D of FIG. 5.

The first sleeve 1 has a cylindrical holding portion 12, shown in FIGS. 4, 5, and 7, extending from the first thread portion 11. The cable 100 is inserted into the second sleeve 2 through the holding portion 12. The holding portion 12 has a plurality of receiving grooves 121 into which the clamp arms 32, 32 are inserted, respectively, to prevent the clamp mechanism 3 from being rotated relative to the first sleeve 1. In this way, it is possible for the clamp arms 32 to smoothly clamp the cable 100.

A seal ring 5 is provided at a portion of the first thread portion 11 which is engaged with the holding portion 12, as shown in FIGS. 4 and 7. In this way, when the first sleeve 1 is engaged with the second sleeve 2, the seal ring 5 is sandwiched between the first sleeve 1 and the second sleeve 2. Thus, it is possible to prevent external impurities such as moisture, dust and the like from entering an interior of the cable connector from the portion of the first sleeve 1 engaged with the second sleeve 2, thereby improving sealability of the cable connector.

The cable fixing apparatus, as shown in FIGS. 4-6, comprises a seal member 4 provided between the clamp mechanism 3 and the bottom portion 22 of the second sleeve 2. The cable 100 passes through the seal member 4. In this case, the clamp mechanism 3 is located between the first thread portion 11 of the first sleeve 1 and the seal member 4, and the annular portion 31 of the clamp mechanism 3 is abutted against the seal member 4. During engagement of the second sleeve 2 onto the first sleeve 1 by gradually rotating, the seal member 4 is compressed so that the external impurities such as moisture, dust, and the like is prevented from entering the interior of the cable connector from a portion of the cable 100 engaged to the through hole 21 of the second sleeve 2, thereby improving the sealability of the cable connector. In an embodiment, as shown in FIG. 6, the seal member 4 has a plurality of steps 41 against which the annular portion 31 of the clamp mechanism 3 abuts.

As shown in FIGS. 1-3, 7, 9 and 13, the third sleeve 6 has a lock mechanism extending from the second thread portion 61 and configured to hold the first sleeve 1 on the third sleeve 6 when the first sleeve 1 is threaded with the third sleeve 6. The lock mechanism has at least one cantilever 62 extending from the second thread portion 61 towards the first sleeve 1 and at least one lock protrusion 621 provided on the at least one cantilever 62 and protruding outwardly. The first sleeve 1 has at least one lock groove 14, shown in FIG. 7, engaged with the at least one lock protrusion 621. During the engagement of the first sleeve 1 to the third sleeve 6 through a forward rotation, the lock protrusion 621 is engaged into the lock groove 14, which may prevent the first sleeve 1 from being disengaged from the third sleeve 6 by a reverse rotation relative to the third sleeve 6.

An electrical device according to an embodiment, as shown in FIGS. 1-4, comprises the cable connector and a mating connector 200 mated with the cable connector. The mating connector 200 has a shield housing 201, shown in FIGS. 8 and 13, an electronic module mounted within the shield housing 201 and configured to be coupled with the cable connector inserted into the shield housing 201. In an embodiment in which the electronic module is an optical-to-electrical converter, an optical signal transmitted from an optical cable used as the cable 100 may be transmitted to the optical-to-electrical converter through the optical fiber connector to achieve an optical-to-electrical conversion. In a case where the electronic module is a mating electrical connector, an electrical signal transmitted from an electrical cable used as the cable 100 may be transmitted to the mating electrical connector through the electrical connector to achieve signal conversion, branching and further transmission of the electrical signal.

In an embodiment, as shown in FIGS. 1, 2, 5, 8, 9, 12, and 13, the electrical device comprises a mounting panel 300 on which the third sleeve 6 is mounted. The mounting panel 300 has a connection through hole 301 through which a cable connector located at a first side of the mounting panel 300 is coupled with an electronic module in the shield housing 201 at a second side of the mounting panel 300. The cable connector is mounted on the mounting panel 300 through a through hole 302 formed in the mounting panel 300.

Figure 8:
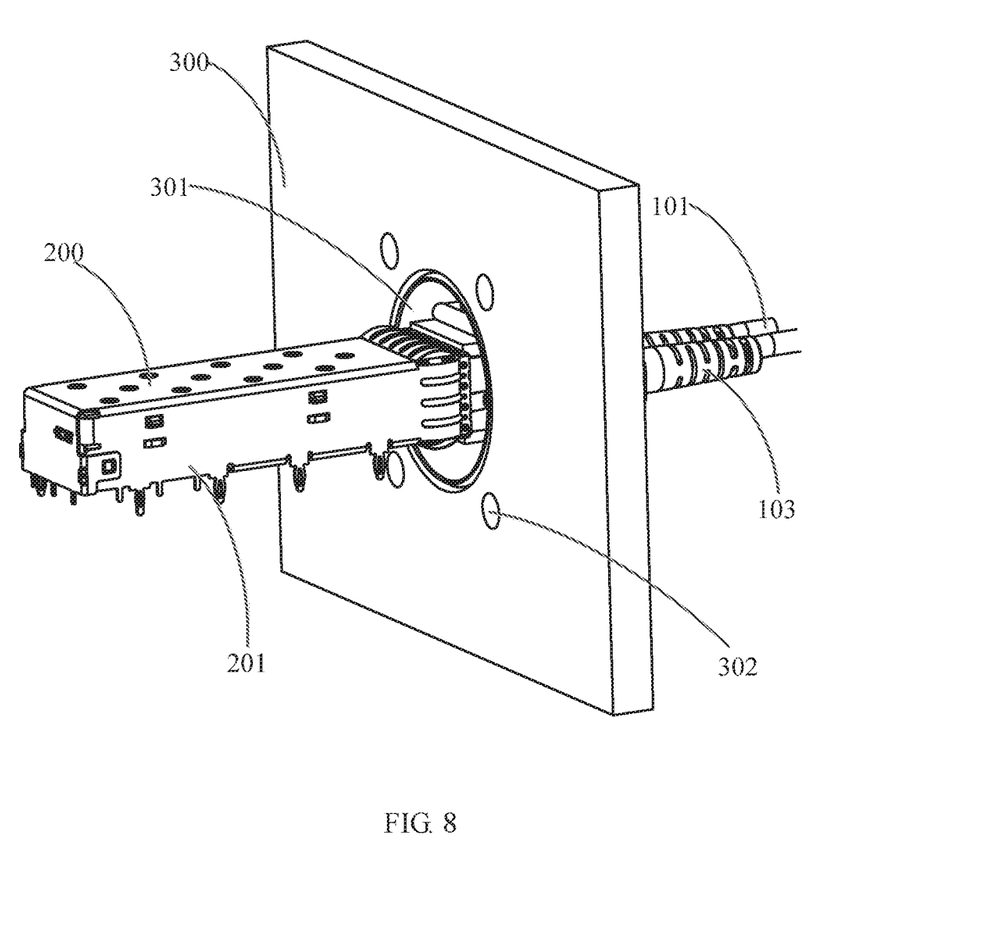
FIG. 8 is an enlarged view of a portion E of FIG. 5.
Figure 9:
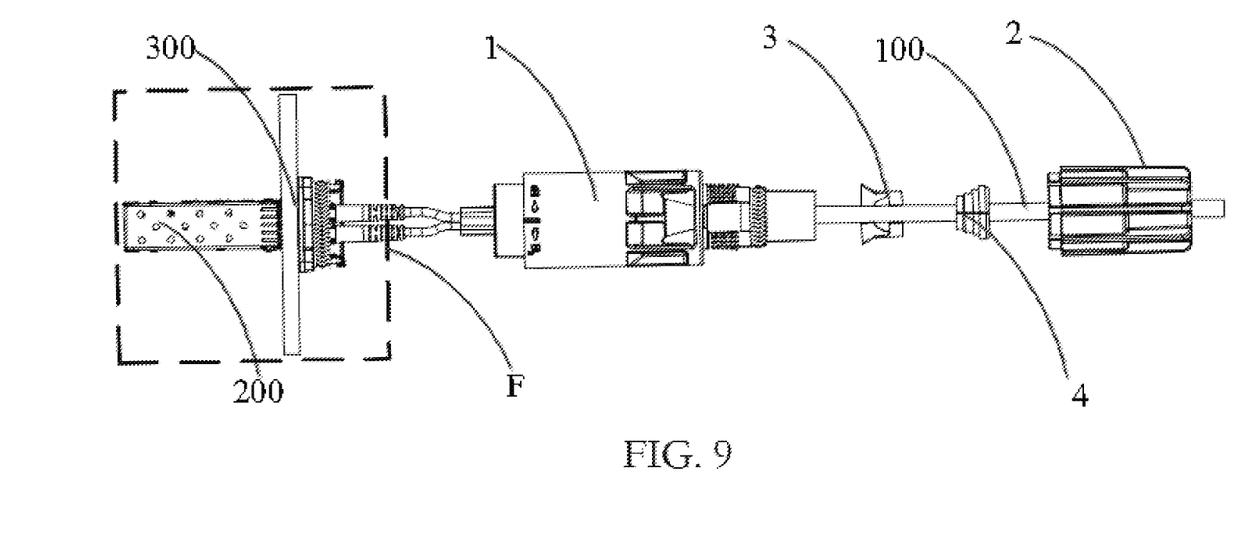
FIG. 9 is a side view of a first step of installing a cable fixing apparatus onto a cable connector according to an embodiment.

A mounting process of an electrical device will be described below by taking a fiber optic connector as a cable connector, with reference to FIGS. 1, 2, and 8-12. As shown in FIGS. 8 and 9, first, an electronic module of a mating connector 201 is mounted within a shield housing 201. The cable connector is then inserted into the shield housing 201 partially to be coupled with the electronic module, and the cable connector is mounted on the mounting panel 300. Thereafter, a protective layer of an optical cable used as the cable 100 is cut away to expose an optical fiber 101. Then, a second sleeve 2, a sealing component 4, a clamp mechanism 3, a first sleeve 1, a protection tube 102 and a tail sleeve 103 are sleeved over the optical fiber 101. Finally, the optical fiber 101 is connected to a fiber connector.

Figure 1:
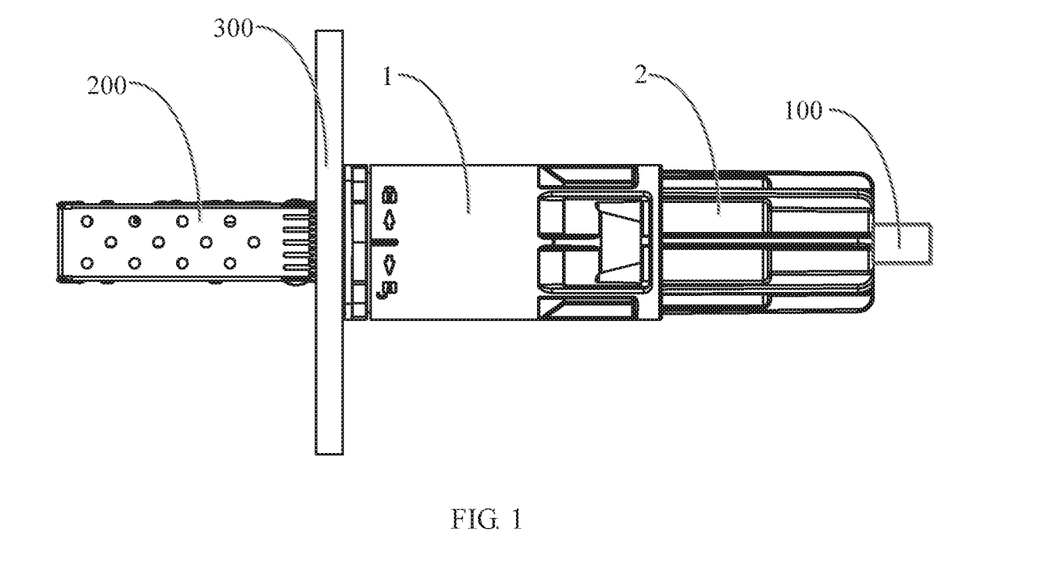
FIG. 1 is a plan view of an electrical device according to an embodiment.
Figure 10:
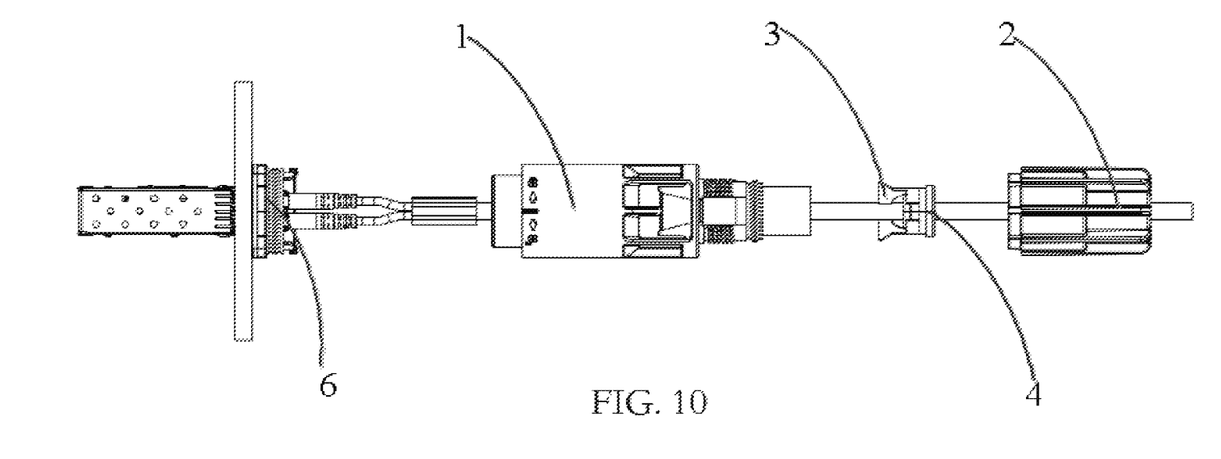
FIG. 10 is a side view of a second step of installing the cable fixing apparatus onto the cable connector.
Figure 11:
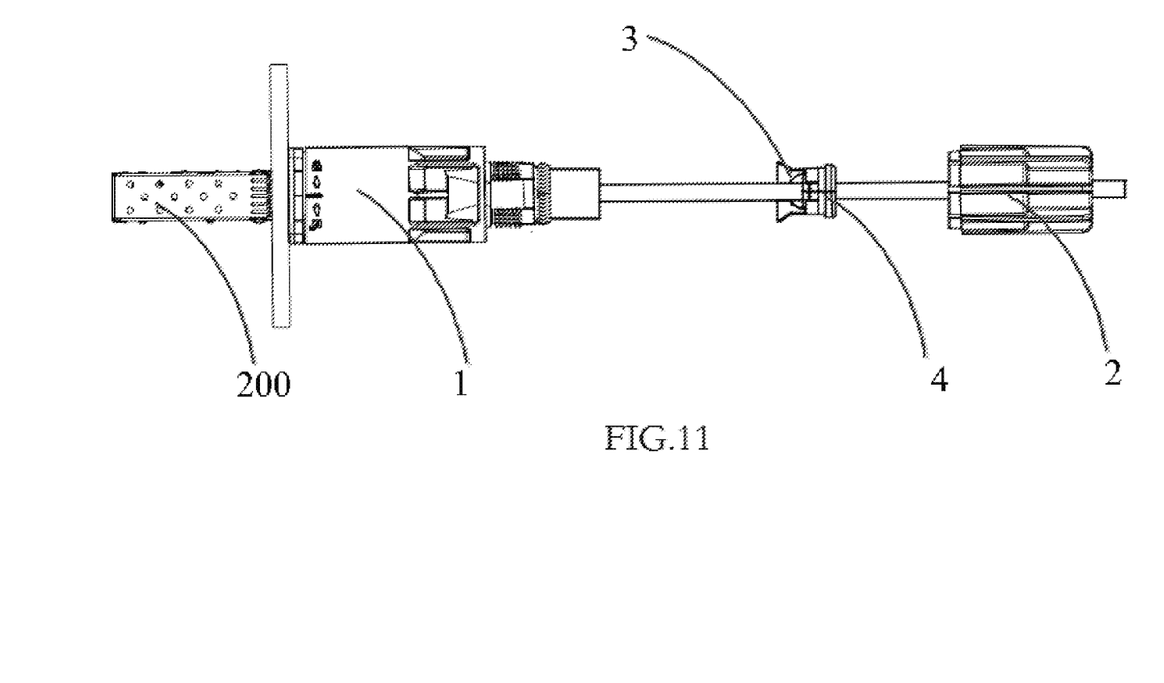
FIG. 11 is a side view of a third step of installing the cable fixing apparatus onto the cable connector.
Figure 12:
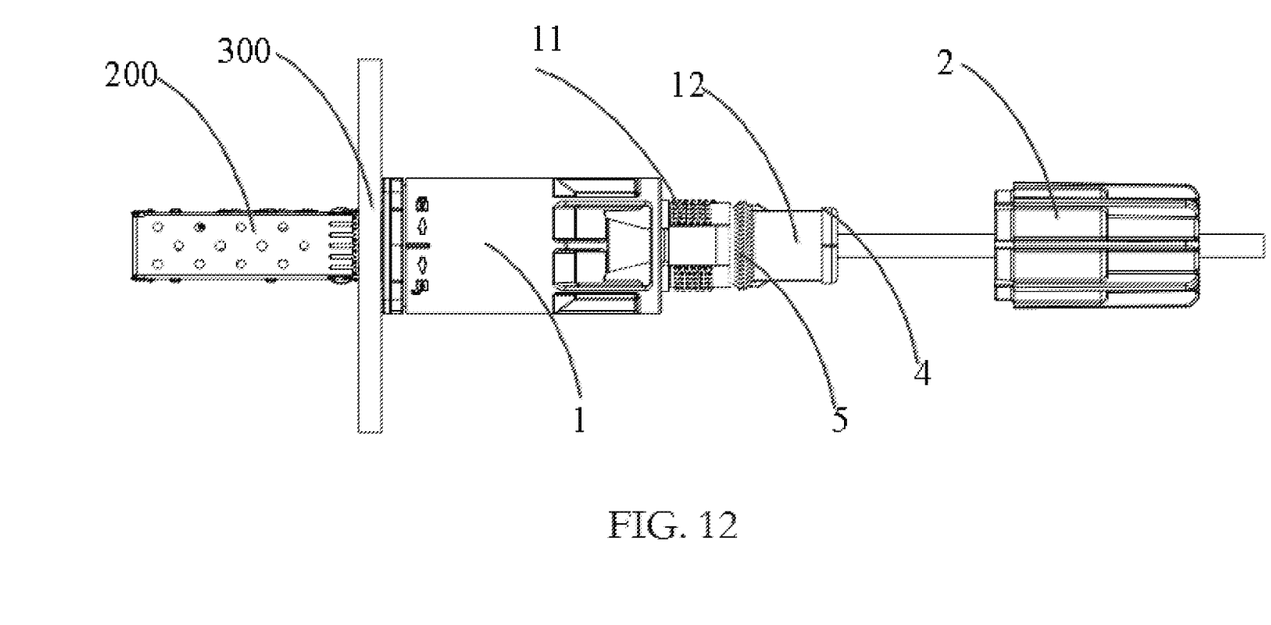
FIG. 12 is a side view of a fourth step of installing the cable fixing apparatus onto the cable connector.

Thereafter, as shown in FIG. 10, the seal member 4 and the clamp mechanism 3 are coupled with each other. As shown in FIG. 11, the first sleeve 1 is engaged to the third sleeve 6. Thereafter, as shown in FIG. 12, the clamp arms 32 of the clamp mechanism 3 coupled with the seal member 4 are inserted into the receiving grooves 121 of the holding portion 12 of the first sleeve 1. Finally, the second sleeve 2 is threaded onto the first sleeve 1, so that the electrical device as shown in FIG. 1 is assembled.

In the cable fixing apparatus, the cable connector, and the electrical device, the clamp mechanism 3 is provided in the second sleeve 2. Thus, during the engagement of the second sleeve 2 to the first sleeve 1 through gradual rotation, the clamp arms 32 of the clamp mechanism 3 are moved radially inwardly toward each other, thereby gradually clamping the cable 100. The cable 100 may be firmly held in the first sleeve 1 and the second sleeve 2, thereby avoiding an axial movement of the cable 100 due to an external force. Further, it is possible to enable rapid assembly and disassembly of the electrical device without any auxiliary tool. Furthermore, it is possible to ensure reliable connection of the cable 100 and the cable connector.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle, so that more product combinations are realized when solving the technical problem of the disclosure.

Although the disclosure has been described hereinbefore in detail with reference to the attached drawings, it should be appreciated that the disclosed embodiments in the attached drawings are intended to illustrate the embodiments of the disclosure by way of example, and should not be construed as limitation to the disclosure. After describing the embodiments of the disclosure in detail, it should be understood by those skilled in the art that various changes and modifications may be made without departing from the spirit and scope of the appended claims, and the disclosure is not limited to the implements of the exemplary embodiments set forth in the description.

What is claimed is:

1. A cable fixing apparatus adapted to be fixed to an end of a cable, comprising:
   a first sleeve having a first thread portion at a first end of the first sleeve and a holding portion extending from the first thread portion;
   a second sleeve having a bottom portion with a through hole at first end of the second sleeve, the cable inserted into the second sleeve and the first sleeve through the through hole in an insertion direction, the second sleeve threaded onto the first thread portion at a second end of the second sleeve;
   a seal ring disposed at a portion of the first thread portion engaged with the holding portion; and
   a clamp mechanism disposed in the second sleeve between the first thread portion of the first sleeve and the bottom portion of the second sleeve, the clamp mechanism clamping the cable in response to an engagement of the second end of the second sleeve to the first thread portion to prevent the cable from moving in the first sleeve and the second sleeve.

2. The cable fixing apparatus of claim 1, wherein the cable is an optical cable or an electrical cable.

3. The cable fixing apparatus of claim 1, wherein the clamp mechanism includes an annular portion sleeved over the cable and a pair of clamp arms each extending from the annular portion in the insertion direction.

4. The cable fixing apparatus of claim 3, wherein an inner wall of the second sleeve has an annular press protrusion protruding radially inwardly, the press protrusion presses the clamp arms radially inwardly toward each other in response to the engagement of the second end of the second sleeve to the first thread portion to clamp the cable.

5. The cable fixing apparatus of claim 4, wherein the annular portion has an opening and an inner diameter of the annular portion is variable.

6. The cable fixing apparatus of claim 4, wherein an inner side surface of each of the clamp arms has a plurality of projections.

7. The cable fixing apparatus of claim 4, wherein the holding portion has a plurality of receiving grooves into which the clamp arms are inserted to prevent the clamp mechanism from being rotated relative to the first sleeve.

8. The cable fixing apparatus of claim 4, wherein each of the clamp arms has a wedge feature protruding radially outwardly with respect to the insertion direction.

9. The cable fixing apparatus of claim 8, wherein the press protrusion has an inclined surface in contact with the wedge feature.

10. The cable fixing apparatus of claim 1, further comprising a seal member disposed between the clamp mechanism and the bottom portion of the second sleeve, the cable passing through the seal member.

11. The cable fixing apparatus of claim 10, wherein the seal member has a plurality of steps.

12. A cable connector, comprising:
    a cable fixing apparatus adapted to be fixed to an end of a cable, the cable fixing apparatus including a first sleeve having a first thread portion at a first end of the first sleeve and a holding portion extending from the first thread portion, a second sleeve having a bottom portion with a through hole at first end of the second sleeve, a seal ring disposed at a portion of the first thread portion engaged with the holding portion, and a clamp mechanism disposed in the second sleeve between the first thread portion of the first sleeve and the bottom portion of the second sleeve, the cable inserted into the second sleeve and the first sleeve through the through hole in an insertion direction, the second sleeve threaded onto the first thread portion at a second end of the second sleeve, the clamp mechanism clamping the cable in response to an engagement of the second end of the second sleeve to the first thread portion to prevent the cable from moving in the first sleeve and the second sleeve;
    a third sleeve having a second thread portion at a first end of the third sleeve, the second thread portion adapted to be engaged with the second end of the first sleeve; and
    a connector body mounted within the third sleeve, the end of the cable is connected to the connector body.

13. The cable connector of claim 12, wherein the third sleeve has a lock mechanism extending from the second thread portion and holding the first sleeve on the third sleeve when the first sleeve is threaded with the third sleeve.

14. The cable connector of claim 13, wherein the lock mechanism has a cantilever extending from the second thread portion towards the first sleeve and a lock protrusion disposed on the cantilever and protruding outwardly.

15. The cable connector of claim 14, wherein the first sleeve has a lock groove engaged with the lock protrusion.

16. An electrical device, comprising:
    a cable connector including:
        a cable fixing apparatus adapted to be fixed to an end of a cable, the cable fixing apparatus including a first sleeve having a first thread portion at a first end of the first sleeve and a holding portion extending from the first thread portion, a second sleeve having a bottom portion with a through hole at first end of the second sleeve, a seal ring disposed at a portion of the first thread portion engaged with the holding portion, and a clamp mechanism disposed in the second sleeve between the first thread portion of the first sleeve and the bottom portion of the second sleeve, the cable inserted into the second sleeve and the first sleeve through the through hole in an insertion direction, the second sleeve threaded onto the first thread portion at a second end of the second sleeve, the clamp mechanism clamping the cable in response to an engagement of the second end of the second sleeve to the first thread portion to prevent the cable from moving in the first sleeve and the second sleeve;
        a third sleeve having a second thread portion at a first end of the third sleeve, the second thread portion adapted to be engaged with the second end of the first sleeve; and
        a connector body mounted within the third sleeve, the end of the cable is connected to the connector body; and
    a mating connector including a shield housing and an electronic module mounted within the shield housing, the electronic module coupled with the cable connector inserted into the shield housing.

17. The electrical device of claim 16, further comprising a mounting panel on which the third sleeve is mounted.

* * * * *